June 26, 1962  W. J. SACKETT  3,041,113
ELEVATOR DUST CONTROL APPARATUS
Filed May 2, 1960  4 Sheets-Sheet 2
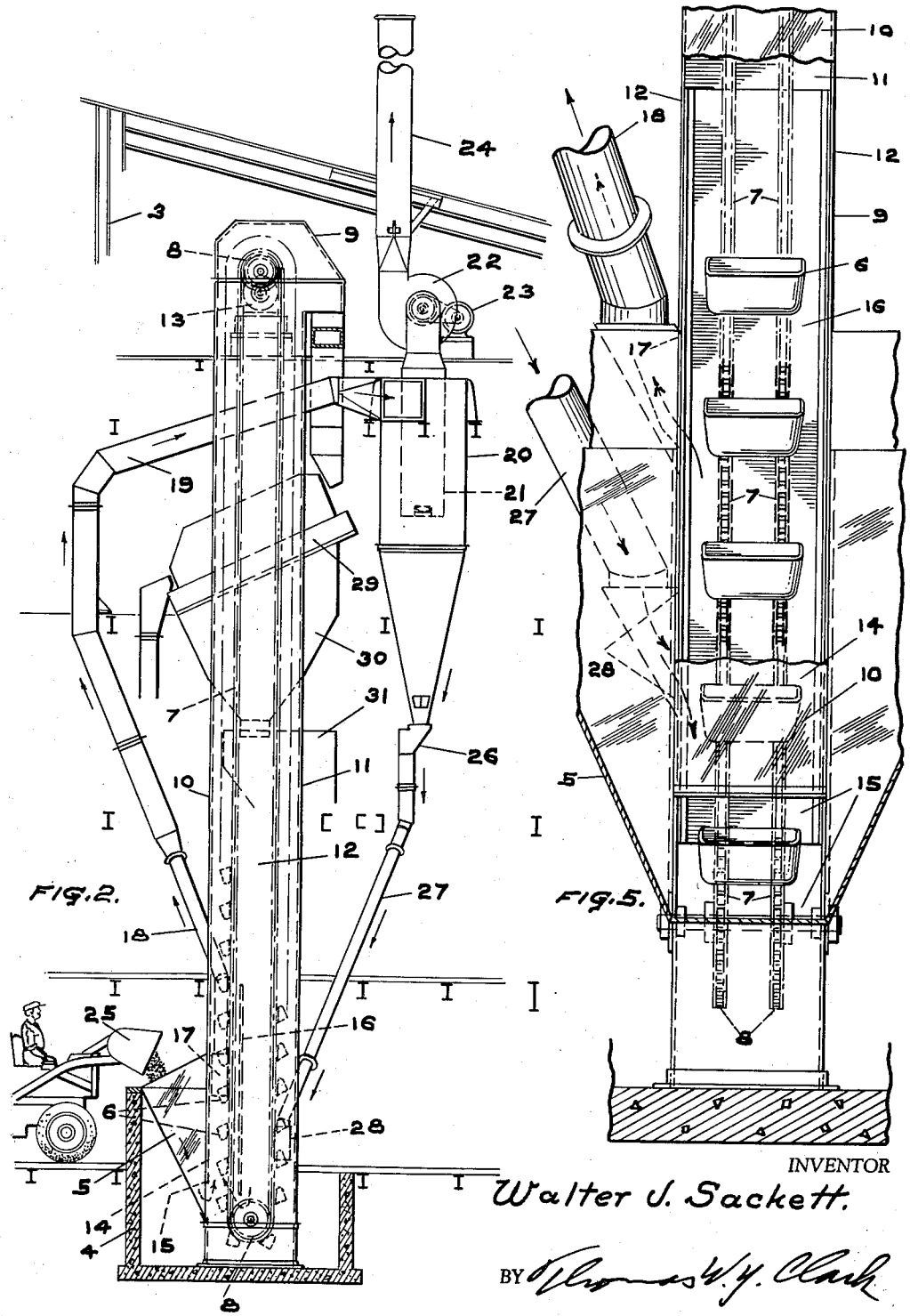
INVENTOR
Walter J. Sackett.
BY
ATTORNEY

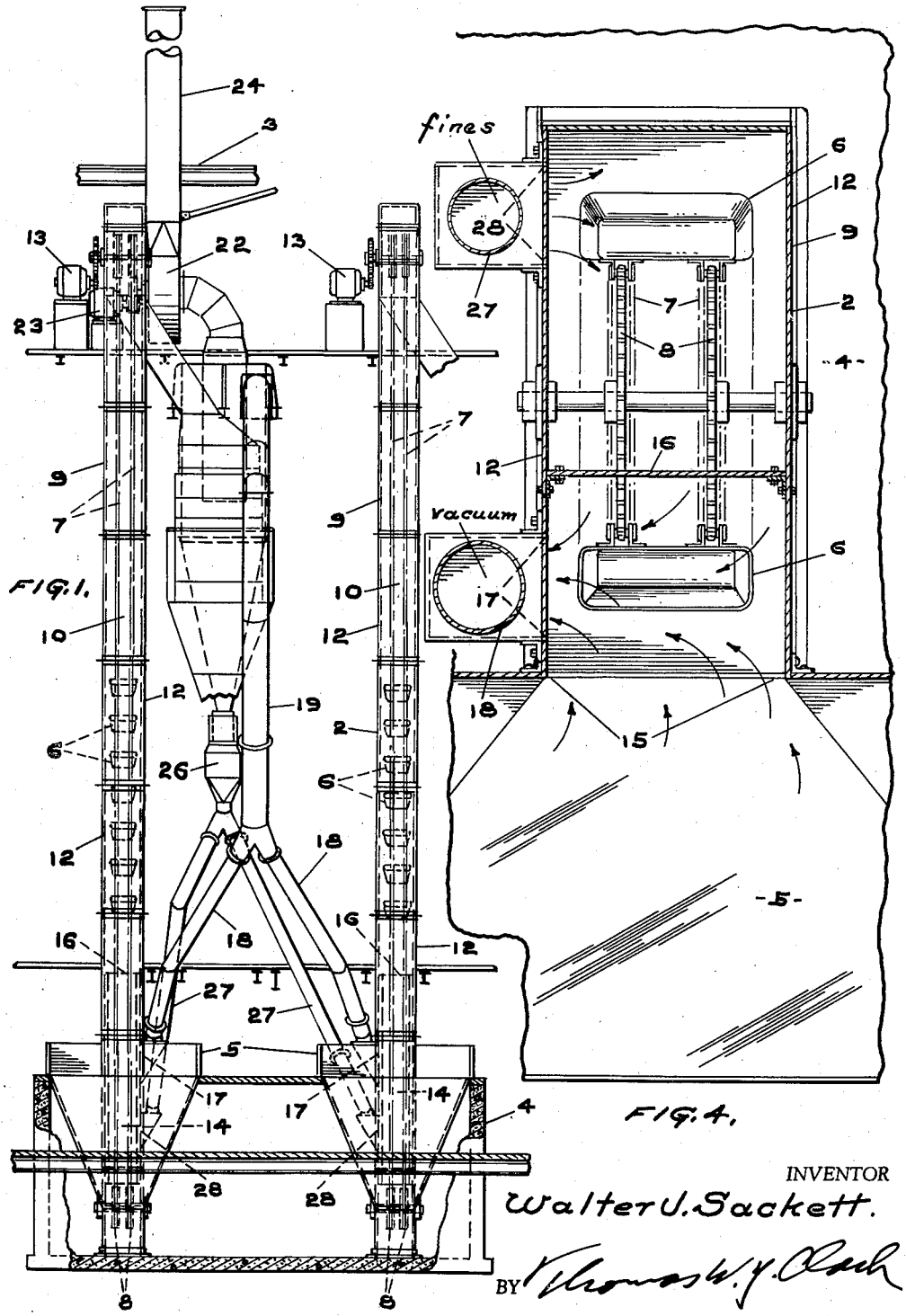

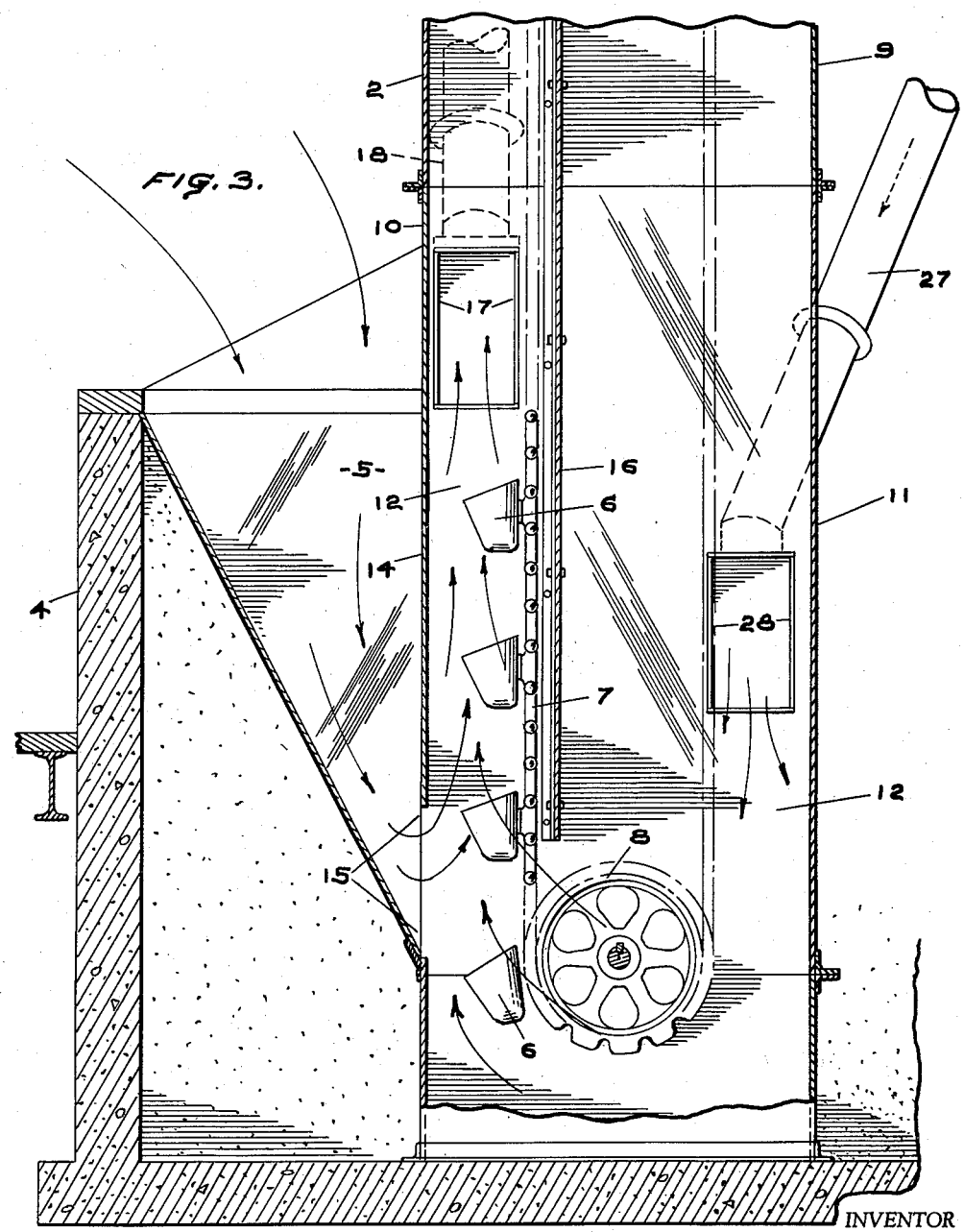

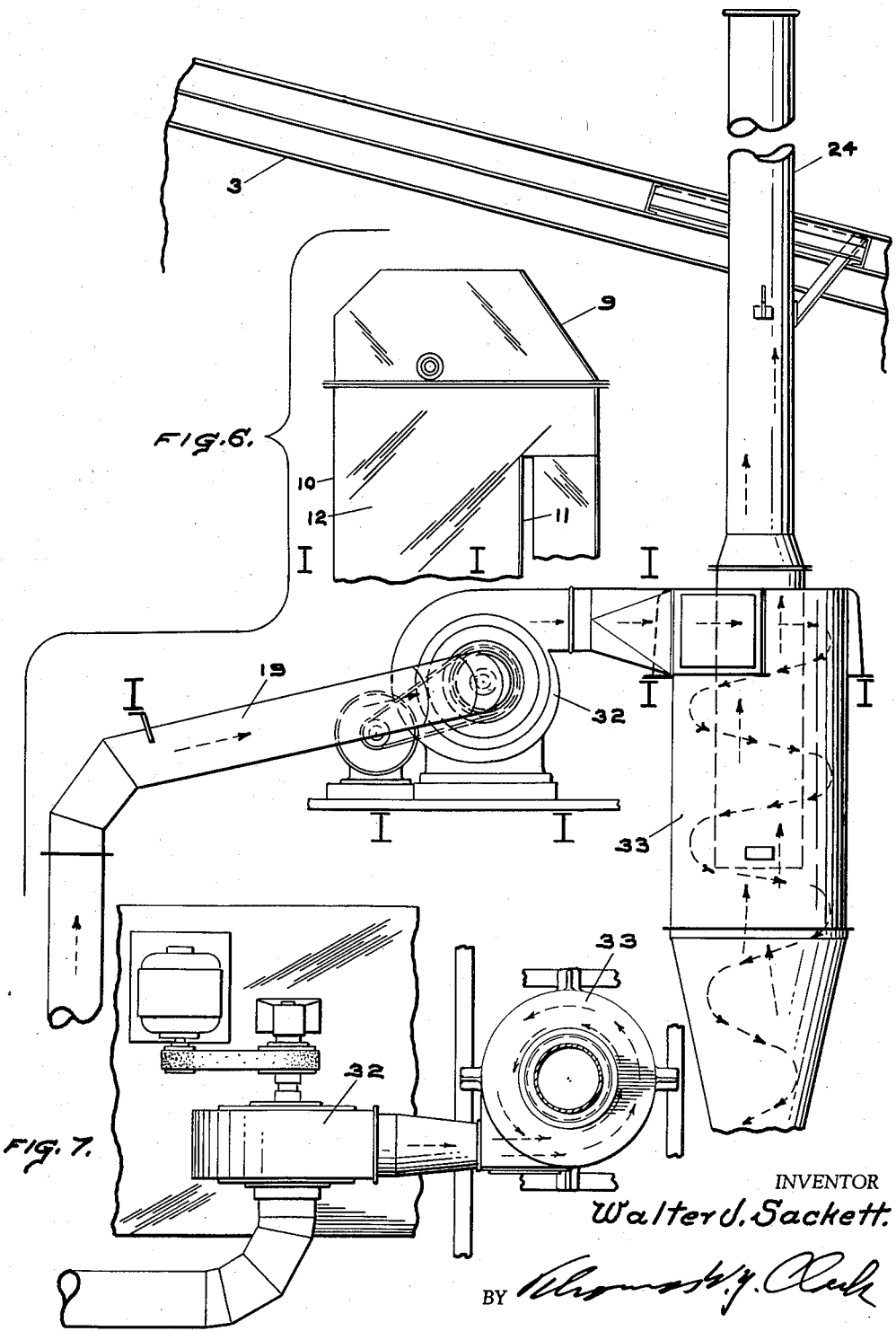

United States Patent Office 3,041,113
Patented June 26, 1962

3,041,113
ELEVATOR DUST CONTROL APPARATUS
Walter J. Sackett, Baltimore, Md., assignor to The A. J. Sackett & Sons Company, Baltimore, Md., a corporation of Maryland
Filed May 2, 1960, Ser. No. 26,009
4 Claims. (Cl. 302—12)

This invention relates to a dust control apparatus for use at the charging hopper of vertical lift bucket elevators which are generally housed within a machinery tower and which is illustrated in relation to its use in such a tower, but it will be apparent that it may be used in other locations in any plant in which bucket elevators receive from tractor shovels or other means dry, finely divided bulk materials at their lower extremities or elevator boots and elevate said material for further handling or storage.

In the delivery of finely divided bulk materials to the hopper or boot of a bucket elevator and the receiving of the material by such elevator, a large amount of the material often creates a cloud of dust adjacent the elevator receiving hopper, the descending buckets act as a fan, to blow dust from the elevator boot, especially when the hopper is nearly empty, also the buckets stir up dust in the elevator boot, which is substantially always full, and the object of the present invention is to eliminate the release of that dust to the surrounding area. Another object of the invention is to recover the material constituting that dust and to return it to the path of the elevator for further handling.

The control of the dust in applicable plants has been and still is one of the greatest problems in their operation in communities in and adjacent cities, as well as being most important to the welfare of the plant personnel.

Other objects and advantages of the invention will be apparent from the following description and the accompanying drawings forming a part hereof and in which:

FIGURE 1 is a front elevational view partly in section, of the elevators involving the present invention as they are installed in the machinery tower of a plant.

FIGURE 2 is a side elevational view thereof, from the right of FIGURE 1.

FIGURE 3 is a fragmentary side elevational view, in section, of the lower part of the elevator.

FIGURE 4 is a horizontal sectional view of the lower part of the elevator and its adjacent hopper.

FIGURE 5 is a partial front sectional view of the lower part of the elevator.

FIGURE 6 is a side elevational view of an alternate form of the cyclone separator and its air directing means, with the elevator cut away.

FIGURE 7 is a top plan view thereof.

In the drawings similar numerals refer to similar parts throughout the several views.

The plurality of elevators 1 and 2 are located in the machinery tower 3 having a concrete pit 4 which houses the lower end and hoppers 5 of the elevators.

The elevators are of the bucket type having buckets 6 mounted on chains 7 going around sprockets 8 at the lower and upper part of the housing 9 which has the forward and rear walls 10 and 11 respectively and side walls 12 in which the shafts of the sprockets 8 rotate. A motor 13 drives the elevator from the top. The front wall 10 extends down substantially into the hopper 5 as at 14 to leave opening 15 at the bottom of the hopper through which material falls to the buckets 6 of the elevator as they resume their upward vertical travel after passing around the lower sprockets 8. A further partition 16 is placed between the sides 12 of the elevator housing immediately to the rear of the ascending run of the elevator buckets and this extends up well above the hopper 5 and substantially down to the sprockets. The front and rear partitions 10 and 16 respectively form a passage not only for the elevator buckets but form a duct for air drawn therethrough from the hopper when it is sufficiently empty to allow air to flow through the opening 15 and from the boot or the lower end of the elevator up to the opening 17 in the side wall 12 of the elevator.

Both elevators 1 and 2 have similar openings connected with ducts 18 which are forked branches of the suction system comprising ducts 19 leading to the side of the cyclone separator 20 in the center of which is a tubular member 21 to the top of which is connected the fan 22 operated by motor 23 to blow a draft of air through stack 24 and create a draft on the conduit 19 which draws the dust from the hopper when it is sufficiently empty to admit a draft therethrough and from the boot of the elevator so that the buckets as they come down their descending path and around the lower sprockets to ascend and stirring up a cloud of dust in the elevators, which is substantially always full, this cloud of dust is drawn through the opening formed by front and rear partitions 10 and 16 and exhausted through opening 17 instead of forcing it out into the surrounding area through opening 15 in hopper 5. This invention, therefore, controls the dust at its source rather than to use a large suction hood placed over the hopper as heretofore practiced. As heretofore practiced adequate space for the free movement of the tractor shovels, such as the one illustrated at 25, used for charging this hopper necessitated the placing of said suction hood too high above the hopper to permit effective control of the dust, whereas this invention eliminates any need for the suction hood.

The dust carried up to the cyclone separator from the air, is separated and allowed to fall back to the boot of the elevator through air lock 26 and divided ducts 27 connected with openings 28 in the same side wall of the elevators as are the openings 17. This dust is dropped into the boot of the elevator in the path of the descending buckets where it may be picked up by the buckets as they ascend again. The main flow of material from the elevators is dropped to the screen 29 and the portion passing through the screen passes to hoppers 30 and to lower hoppers 31 where it may be passed to the bagging machinery such as that shown in applicant's Patent No. 2,727,669, December 20, 1955.

From the above description it will be apparent that a very economical apparatus has been constructed to clear the dust from the inlet end of the elevators which have at times created such a cloud of dust that an operator could not see before himself when the hoppers are partly empty and the buckets beat up such a whirl of air as to lift a tremendous amount of dust from the boots of the elevators.

A modified form of the suction creating means is shown in FIGURES 6 and 7 in which the draft duct 19 itself leads through the side of fan 32 carrying the dust with it and blows it through the cyclone separator 33 from which the dust falls to conduits 27 through an air lock 26 identical to those of the first modification. The only difference being that the combined air and dust are driven to the upper top of the cyclone separator instead of being drawn in on the suction side of the fan.

It will be apparent that many modifications may be made in the construction above described without departing from the invention as defined in the following claims.

What is claimed as new and is desired to be secured by Letters Patent is:

1. In combination with a substantially vertical endless bucket elevator having a receiving hopper at its lower end in which the buckets pass around supporting sprockets, at its lower end the elevator being spaced rearwardly of the hopper, the elevator including surrounding back, front and side walls to enclose the buckets, a dust collector comprising partitions, one being a continuation of the front elevator wall and extending down into the hopper, to direct material therefrom into buckets when just commencing their vertical ascent and another positioned in the rear of the ascending buckets from adjacent the bottom of the first named partition, the partitions and elevator side walls forming a passage for the loaded ascending buckets, a suction duct entrance in one side of said passage substantially above the lower ends of said partitions and adjacent the hopper top, and means to create a draft in said suction duct to draw the dust through the hopper and said passage upon the material being dropped into the hopper and received by the buckets of the elevator, said partitions funnelling the dust around the lower ends thereof from the hopper and buckets upon the impact of the material therewith and into the suction duct.

2. The dust collector of claim 1 including a dust separator connected to the suction duct and having a discharge at the lower end of the elevator to return collected dust thereto.

3. The dust collector of claim 1 including a cyclone separator connected with the suction duct and a duct leading from said separator with a discharge at the lower end of the elevator to return collected dust thereto.

4. The dust collector of claim 1 including a cyclone separator connected with the suction duct and providing the suction therefor, and a duct leading from said separator with a discharge at the lower end of the elevator to return collected dust thereto.

References Cited in the file of this patent

UNITED STATES PATENTS

| | | |
|---|---|---|
| 429,493 | Allin | June 3, 1890 |
| 1,130,443 | Street | Mar. 2, 1915 |